US009775055B2

(12) United States Patent
Born

(10) Patent No.: US 9,775,055 B2
(45) Date of Patent: Sep. 26, 2017

(54) RADIO PERFORMANCE CALCULATOR

(71) Applicant: The Boeing Company, Chicago, IL (US)

(72) Inventor: Andrew Vincent Born, Los Alamitos, CA (US)

(73) Assignee: THE BOEING COMPANY, Chicago, IL (US)

( * ) Notice: Subject to any disclaimer, the term of this patent is extended or adjusted under 35 U.S.C. 154(b) by 933 days.

(21) Appl. No.: 14/031,418

(22) Filed: Sep. 19, 2013

(65) Prior Publication Data
US 2015/0304861 A1 Oct. 22, 2015

(51) Int. Cl.
H04W 24/02 (2009.01)
H04W 24/04 (2009.01)

(52) U.S. Cl.
CPC .......... *H04W 24/02* (2013.01); *H04W 24/04* (2013.01)

(58) Field of Classification Search
None
See application file for complete search history.

(56) References Cited

U.S. PATENT DOCUMENTS

| | | | | |
|---|---|---|---|---|
| 6,971,063 | B1* | 11/2005 | Rappaport | H04L 41/145 709/203 |
| 7,280,897 | B2 | 10/2007 | Allstadt et al. | |
| 2003/0023412 | A1* | 1/2003 | Rappaport | H04W 16/20 703/1 |
| 2004/0143428 | A1* | 7/2004 | Rappaport | G06F 17/509 703/22 |
| 2004/0259555 | A1* | 12/2004 | Rappaport | H04W 16/18 455/446 |
| 2005/0043933 | A1* | 2/2005 | Rappaport | H04L 41/22 703/1 |
| 2005/0265321 | A1* | 12/2005 | Rappaport | H04L 41/145 370/352 |
| 2006/0019679 | A1* | 1/2006 | Rappaport | H04W 64/00 455/456.5 |
| 2010/0070256 | A1* | 3/2010 | Nilsson | H04L 41/147 703/13 |

(Continued)

OTHER PUBLICATIONS

"IEEE Standard for Distributed Interactive Simulation—Application Protocols," IEEE Computer Society, IEEE Std 1278.1-2012, dated Dec. 19, 2012, 747 pages.

(Continued)

*Primary Examiner* — Chi H Pham
*Assistant Examiner* — Ronald H Davis
(74) *Attorney, Agent, or Firm* — Yee & Associates, P.C.

(57) ABSTRACT

A radio performance analyzer is provided comprising a cloud-accessible user communications interface and a radio performance calculator configured to compute a measure of performance for a plurality of networked radios operable in a geographic region, wherein the user communications interface is configured to receive a selection of a number of radios in the plurality of networked radios, wherein a selection is formed, the radio performance calculator computes the measure of performance of the selection for a plurality of locations in the geographic region spanning a selected period of time, and the radio performance calculator computes the measure of performance based on calculations of bit error rate and signal-to-noise ratio.

16 Claims, 14 Drawing Sheets

(56) References Cited

U.S. PATENT DOCUMENTS

| | | | | |
|---|---|---|---|---|
| 2011/0151874 A1* | 6/2011 | Olsson | ................ | H04W 60/005 |
| | | | | 455/436 |
| 2012/0303826 A1* | 11/2012 | Nelson | ............... | H04B 7/18506 |
| | | | | 709/228 |
| 2013/0082872 A1* | 4/2013 | Yule | ...................... | G01S 5/0252 |
| | | | | 342/357.25 |
| 2014/0024365 A1* | 1/2014 | Mitchell | ............ | H04B 7/18506 |
| | | | | 455/431 |
| 2014/0266867 A1* | 9/2014 | Liu | ................... | H04B 7/18513 |
| | | | | 342/200 |
| 2015/0256401 A1* | 9/2015 | Zinger | ................... | H04L 41/14 |
| | | | | 370/401 |

OTHER PUBLICATIONS

"DIS Data Dictionary—Transmitter PDU," DIS Data Dictionary, 3 pages. Accessed Jun. 19, 2013, http://faculty.nps.edu/brutzman/vrtp/mil/navy/nps/disEnumerations/JdbeHtmlFiles/pdu/dc.htm.

"DIS Data Dictionary—Entity State PDU," DIS Data Dictionary, 3 pages. Accessed Jun. 19, 2013, http://faculty.nps.edu/brutzman/vrtp/mil/navy/nps/disEnumerations/JdbeHtmlFiles/pdu/29.htm.

"Distributed Interactive Simulation," Wikipedia, dated Jun. 15, 2013, 4 pages. Accessed Jun. 19, 2013, http://en.wikipedia.org/wiki/Distributed_Interactive_Simulation.

"DIS Data Dictionary—Signal PDU," DIS Data Dictionary, 3 pages. Accessed Jun. 19, 2013, http://faculty.nps.edu/brutzman/vrtp/mil/navy/nps/disEnumerations/JdbeHtmlFiles/pdu/f4.htm.

"DIS Data Dictionary—Signal PDU," DIS Data Dictionary, 3 pages. Accessed Jun. 19, 2013, http://faculty.nps.edu/brutzman/vrtp/mil/navy/nps/disEnumerations/JdbeHtmlFiles/pdu/fd.htm.

* cited by examiner

400

402 — Frequency for radios. Unit: Megahertz (MHz)
- Frequency for radio 1 ——
- Frequency of radio 2 ——
- 412 — Frequency of jammer 1 ——

404 — RF Bandwidth of radios. Unit: Megahertz (MHz)
- RF Bandwidth of radio 1 ——
- 414 — RF Bandwidth of radio 2 ——
- RF Bandwidth of jammer 1 ——

406 — Gain of antenna for radios: Unit: dBi
- 416 — Gain of antenna for radio 1 ——
- Gain of antenna for radio 2 ——
- Gain of antenna for jammer 1 ——

408 — Transmit power for radios. Unit: Watts (click here for dBW)
- 418 — Transmit power for radio 1 ——
- Transmit power for radio 2 ——
- Transmit power for jammer 1 ——

410 — Modulation for radios. Unit (none). Use pulldown menu
- 420 — Modulation for radio 1 ——
- Modulation for jammer 1 ——

| Modulation Types for radios, per International Telecommunication Union (ITU) | |
|---|---|
| Letter | Details |
| A | Double sideband, DSB, including DSB full carrier, i.e. amplitude modulation |
| B | Independent sideband, i.e. two sidebands present, each carrying different information |
| C | Vestigial sideband |
| D | Combination of AM and FM or PM, either simultaneously or in a pre-established sequence |
| F | Frequency modulation, FM |
| G | Phase modulation, PM |
| H | Single sideband full carrier |
| J | Single sideband suppressed carrier, SSBSC |
| K | Pulse amplitude modulation, PAM |
| L | Pulse width modulation, PWM |
| M | Pulse position modulation, PPM |
| N | Un-modulated carrier |
| P | Series of pulses without modulation |
| Q | Sequence of pulses, phase of frequency modulation within each pulse |
| R | Single sideband with reduced or variable level carrier |
| V | Combination of pulse modulation methods |
| W | Combination of any of above |
| X | Cases not covered by the above definitions |

600

If using phase modulation, then select the following type of modulation:

1. PM - Phase Modulation ⟋602
2. PSK - Phase Shift Keying
3. BPSK - Binary Phase Shift Keying ⟋604
4. QPSK - Quadrature Phase Shift Keying
5. 8 PSK - 8 Point Phase Shift Keying
6. 16 PSK - 16 Point Phase Shift Keying ⟋606
7. QAM - Quadrature Amplitude Modulation
8. 16 QAM - 16 Point Quadrature Amplitude Modulation
9. 64 QAM - 64 Point Quadrature Amplitude Modulation
10. MSK - Minimum Shift Keying
11. GMSK - Gaussian Filtered Minimum Shift Keying

FIG. 6

```
<? Input file: Location and radio parameter information in XML format?>
<location of node 1> 42.12345, 171.45632, 1000.000 <\ location of node 1>
<location of node 2> 42.32345, 172.45632, 1000.000 <\ location of node 2>   ⎫
<location of node 3> 42.53450, 173.45632, 1000.000 <\ location of node 3>   ⎬ 902
<location of node 4> 44.32345, 174.45632, 1000.000 <\ location of node 4>   ⎪
<location of node 5> 48.32345, 171.45632, 1000.000 <\ location of node 5>   ⎭
<Frequency of radio 1>,980, <\ Frequency of radio 1>   ⎫
<Frequency of radio 2>,980, <\ Frequency of radio 2>   ⎪
<Frequency of radio 3>,980, <\ Frequency of radio 3>   ⎬ 904
<Frequency of radio 4>,980, <\ Frequency of radio 4>   ⎪
<Frequency of radio 5>,980, <\ Frequency of radio 5>   ⎭
906 — <Frequency of jammer 1>,980, <\ Frequency of jammer 1>
<RF Bandwidth of radio 1>,20, <\ RF Bandwidth of radio 1>   ⎫
<RF Bandwidth of radio 2>,20, <\ RF Bandwidth of radio 2>   ⎪
<RF Bandwidth of radio 3>,20, <\ RF Bandwidth of radio 3>   ⎬ 908
<RF Bandwidth of radio 4>,20, <\ RF Bandwidth of radio 4>   ⎪
<RF Bandwidth of radio 5>,20, <\ RF Bandwidth of radio 5>   ⎭
910 — <RF Bandwidth of jammer 1>,30, <\ RF Bandwidth of jammer1>
<Gain of antenna for radio 1>,12, <\ Gain of antenna for radio 1>   ⎫
<Gain of antenna for radio 2>,12, <\ Gain of antenna for radio 2>   ⎪
<Gain of antenna for radio 3>,12, <\ Gain of antenna for radio 3>   ⎬ 912
<Gain of antenna for radio 4>,12, <\ Gain of antenna for radio 4>   ⎪
<Gain of antenna for radio 5>,12, <\ Gain of antenna for radio 5>   ⎭
914 — <Gain of antenna for jammer 1>,20, <\ Gain of antenna for jammer 1>
<Transmit power for radio 1>, 50, <\ Transmit power for radio 1>   ⎫
<Transmit power for radio 2>, 50, <\ Transmit power for radio 2>   ⎪
<Transmit power for radio 3>, 50, <\ Transmit power for radio 3>   ⎬ 916
<Transmit power for radio 4>, 50, <\ Transmit power for radio 4>   ⎪
<Transmit power for radio 5>, 50, <\ Transmit power for radio 5>   ⎭
<Transmit power for jammer 1>, 500, <\ Transmit power for jammer 1> — 918
920 — <Modulation for radio 1>, QPSK, <\ Modulation for radio 1>
       <Modulation for jammer 1>, QPSK, <\ Modulation for jammer 1> — 922
```

| Radio | to | Radio | Throughput (kbps) |
|---|---|---|---|
| 1 | to | 2 | 300 |
| 1 | to | 3 | 300 |
| 1 | to | 4 | 300 |
| 1 | to | 5 | 300 |
| 2 | to | 1 | 300 |
| 2 | to | 3 | 330 |
| 2 | to | 4 | 300 |
| 2 | to | 5 | 300 |
| 3 | to | 1 | 220 |
| 3 | to | 2 | 300 |
| 3 | to | 4 | 300 |
| 3 | to | 5 | 300 |
| 4 | to | 1 | 300 |
| 4 | to | 2 | 300 |
| 4 | to | 3 | 300 |
| 4 | to | 5 | 300 |
| 5 | to | 1 | 300 |
| 5 | to | 2 | 300 |
| 5 | to | 3 | 300 |
| 5 | to | 4 | 250 |

FIG. 16
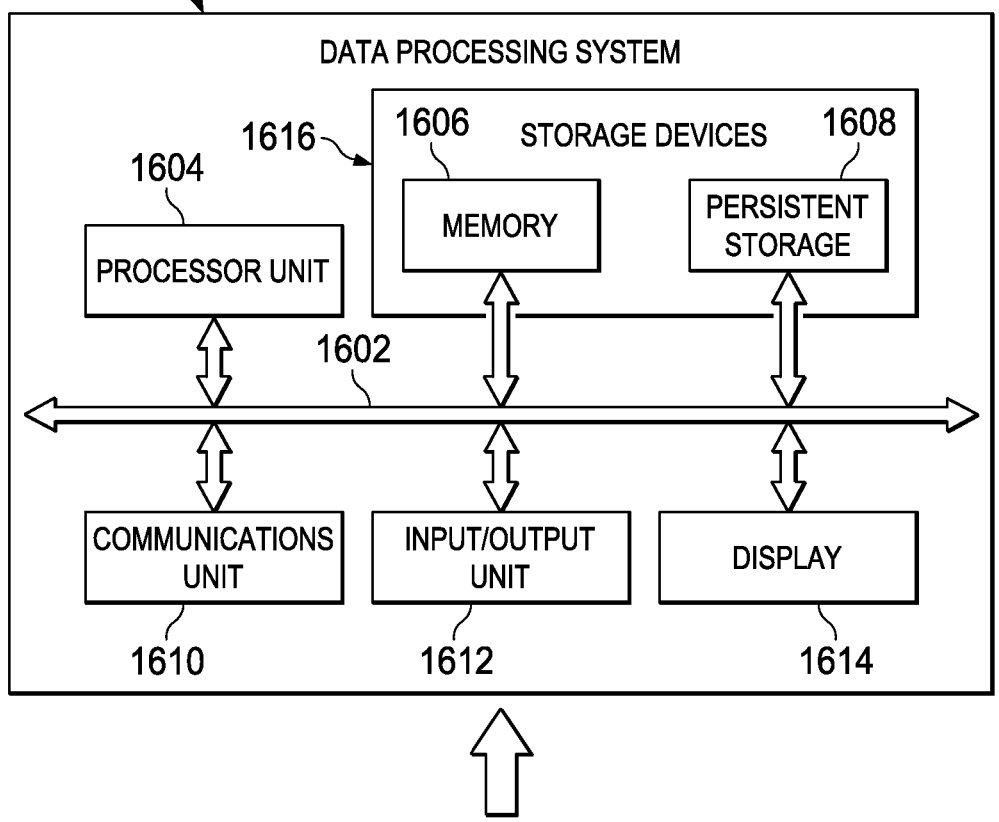
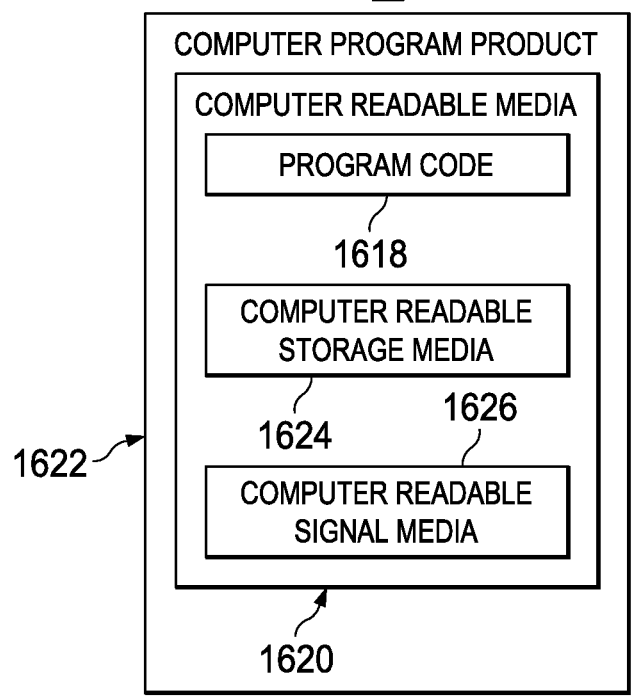

RADIO PERFORMANCE CALCULATOR

BACKGROUND INFORMATION

1. Field

The present disclosure relates generally to transmission of radio signals, and more particularly, to the prediction of measurement of performance of radio signals between at least two points.

2. Background

Radio signal performance may be impacted by numerous technical and environmental factors. Technical parameters of radios such as power level, antenna gain, process gain, and modulation may impact signal strength. Physical distance between a sending node and a receiving node and weather and other environmental conditions between the nodes may be significant factors in radio signal performance.

Propagation loss also affects radio signal strength. Whether radio signals travel on a direct line of sight or on an over-the-horizon path may impact signal propagation. Radio waves are affected by other natural phenomena such as reflection, refraction, diffraction, absorption, polarization, and scattering.

Natural terrain, such as mountains, may present obstacles to radio signal transmission. Manmade objects such as buildings may also obstruct or retard signal transmission.

Aviators, ship operators, law enforcement agencies, and others may be interested in maintaining uninterrupted communications both with colleagues in the field and with base operations. Consistently strong and reliable radio signal strength may support communication and promote safety and economy in operations. Reduction of signal strength or outright failure of radio communications may have serious consequences. Some radio users may be contractually subject to quality of service (QoS) requirements in their operations. Such users may be subject to penalty or liability if quality of service requirements is not met.

Additionally, airlines, forest services, and border patrol agencies may operate a large number of radios whose locations are regularly changing. The environments in which those radios are being operated may also be continually changing. Knowledge of radio performance in these environments may be desirable.

When a radio is in motion, for example aboard an aircraft or ship, the environment for radio signal transmission may be continually changing. As an aircraft moves, a radio aboard the aircraft will be transmitting signals through varying distance as well as space that are subject to environmental changes such as weather, including weather systems as well as variations in atmospheric characteristics. Physical terrain encountered by an aircraft in motion, both natural and manmade, also continually changes. Radio signal performance for some operators must be maintained at certain levels despite weather, terrain, and other changes that impact radio performance.

Radio operators have traditionally installed costly hardware and software to meet the challenge of continually assuring radio signal strength. Such operators may be required to purchase licenses for software applications and data sources that assist in determining and supporting radio signal performance. Further, in many cases, radio positions and other information must be entered manually and frequently by these operators. Data sources regarding terrain, natural and manmade, as well as sources of weather data may not be consistently available and reliably correct and current.

Radio operators in aviation, maritime, law enforcement, military, and other fields use radios for a variety of communications purposes. Their radios may be continually changing location and therefore be subject to the variety of continually changing environmental and other obstacles discussed herein that may cause changes in signal strength. For safety and performance, such radio operators may need to maintain radio performance and be confident that radio performance meets minimum requirements under the variety of constantly changing conditions.

Therefore, it would be advantageous to have a method and apparatus that takes into account one or more of the issues discussed above, as well as possibly other issues.

SUMMARY

The illustrative embodiments provide a radio performance analyzer comprising a cloud-accessible user communications interface and a radio performance calculator configured to compute a measure of performance for a plurality of networked radios operable in a geographic region. The user communications interface may be configured to receive a selection of a number of radios in the plurality of networked radios, wherein a selection is formed. The radio performance calculator computes the measure of performance of the selection for a plurality of locations in the geographic region spanning a selected period of time. The radio performance calculator computes the measure of performance based on calculations of bit error rate and signal-to-noise ratio.

The illustrative embodiments also provide a method of providing radio performance results, comprising a user interface receiving at least one of location information and radio parameters associated with at least three radios. The method also comprises calculating radio performance associated with any two of the least three radios based on at least the location information and the radio parameters. A calculated radio performance is generated as a throughput rate based on calculations of bit error rate and signal-to-noise ratio. The method also comprises transmitting the calculated radio performance via a wide area network.

The illustrative embodiments also provide an aircraft comprising a fuselage configured for flight and a computer, comprising a bus, a processor connected to the bus, and a memory connected to the bus, the memory storing program code which, when executed by the processor, performs a computer-implemented method, the program code comprising program code for performing, using the processor, sending a first message requesting a prediction of radio performance between at least two locations, program code for performing, using the processor, entering coordinates for the at least two locations, and program code for performing, using the processor, receiving the requested prediction of radio performance. The measure of radio performance is based on calculations of bit error rate and signal-to-noise ratio.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is a depiction of a user communications interface in accordance with an illustrative embodiment.

FIG. 5 is a depiction of a user communications interface in accordance with an illustrative embodiment.

FIG. 6 is a depiction of a user communications interface in accordance with an illustrative embodiment.

FIG. 9 is a depiction of a user communications interface in accordance with an illustrative embodiment.

FIG. 11 is a depiction of a user communications interface in accordance with an illustrative embodiment.

FIG. 16 is an illustration of a data processing system, in accordance with an illustrative embodiment.

DETAILED DESCRIPTION

Figure 1:
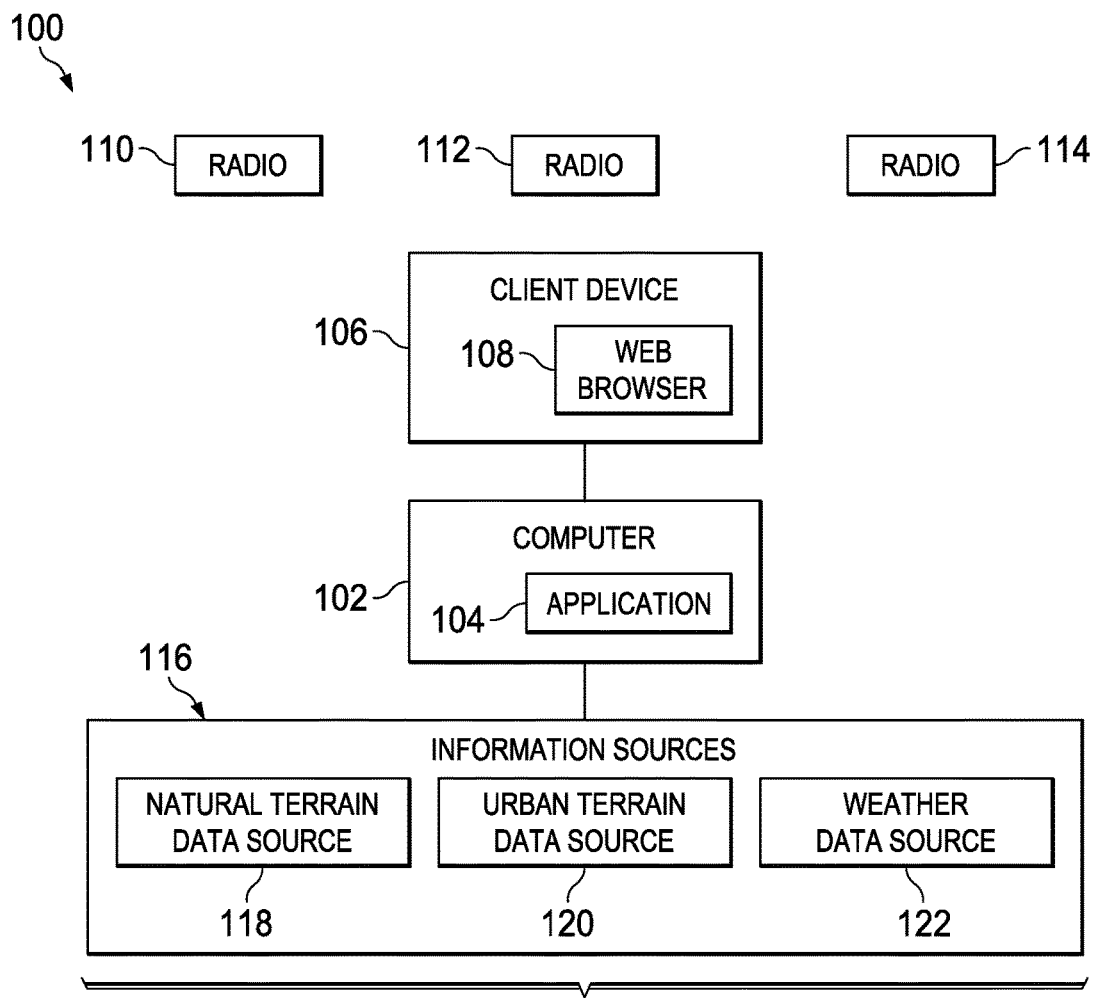
FIG. 1 is a block diagram of a system of a radio performance calculator in accordance with an illustrative embodiment.

The illustrative embodiments recognize and take into account the issues described above. Thus, the illustrative embodiments provide methods and systems that evaluate radio signal strength between at least two points and provide a prediction of measure of performance (MOP) of the signal strength. The illustrative embodiments may also assist in determining whether an unobstructed line of sight exists between points that may be associated with radios, laser systems, directed energy systems, and other devices.

The illustrative embodiments recognize that signal strength between radios located at various physical points may be affected by natural and manmade natural factors. Natural factors include weather conditions and terrain between transmitting and receiving radios. Manmade factors include attributes of the radios involved in transmission, for example antenna gain, process gain, modulation, and power level. Manmade factors also include manmade impediments that may block or otherwise affect radio signal strength including buildings, power lines, and jamming or interference effects. Any of these natural and manmade factors may affect radio signal performance.

The illustrative embodiments provide a web service accessible from a web browser on a client device that allows a user to enter information about radios and their locations. The web service is a radio performance calculator that receives the radio and location information. The calculator accesses sources of information about weather, natural terrain, and urban or manmade terrain between transmitting and receiving radios. The sources of information may be publicly available databases or other data stores and may be accessible via the Internet or other wide area network.

Based on the radio information and the operating environment information gathered from the sources, the calculator may generate and provide a measure of performance of the received signal strength. The measure of performance may be a prediction by the calculator of the signal strength based on the entered radio and location information. The prediction may be expressed as a data throughput rate, for example in kilobits per second (kbps) or megabits per second (Mbps).

Radios may be stationary or in motion. Radios may be mounted aboard spacecraft, aircraft, watercraft, or vehicles, and may be carried by persons. While in the illustrative embodiments the web service provided by the radio performance calculator may be accessed by a user entering location and other information into a web browser at a client device, in other embodiments location information may be generated and transmitted automatically without user involvement. For example, a global positioning system (GPS) device may continually generate updated location information for a moving radio. The location information may be automatically submitted on a periodic basis to the radio performance calculator for predictions of measure of performance. Global positioning system information may be transmitted to the radio performance calculator via satellite connection.

Users of the radio performance calculator may use the measure of performance to make determinations about whether a particular radio will meet quality of service (QoS) requirements under certain operating conditions. Because the illustrative embodiments provide the radio performance calculator as a web service, a user may benefit from technical effects that promote access of the calculator from a web browser without the need to load any special software or hardware. Illustrative embodiments provide further beneficial technical effects promoting more informed selection of radios given a user's needs and operating environment.

In addition to accepting input from a user via a web browser, the radio performance calculator may accept data provided in extensible markup language (XML) format, in binary format, and in several distributed simulation formats, for example standard 1278 issued by the Institute of Electrical and Electronics Engineers (IEEE). The radio performance calculator may enable numerous simultaneous calculations wherein if a user enters locations for a number of radios, the calculator may predict radio signal performance for links between each of the number of radios and may depict the predicted signal performance using a map.

The illustrative embodiments recognize that the radio performance calculator may determine predicted signal performance by first converting signal to noise ratio to bit error rate. The calculator then may convert bit error rate to throughput and may use various tables to make its prediction. Throughput may be expressed in kilobits per second (kbps) or megabits per second (Mbps).

Attention is now turned to the figures. FIG. 1 is a block diagram of a system of a radio performance calculator in accordance with an illustrative embodiment. System 100 includes computer 102. Computer 102 may be a general purpose computer. General purpose computers are described with respect to FIG. 16. Application 104 may execute on computer 102. Application 104 includes a radio performance calculator and supporting software components. Application 104 may be provided as a cloud-based web service over the World Wide Web of the Internet or via other network.

System 100 includes client device 106 accessed by a user to submit requests for predictions of measures of performance of radio signal. Client device 106 may be a desktop computer, a laptop computer, a tablet computer, a personal digital assistant, a mobile telephone, or other wireless communications device. Web browser 108 may execute on client device 106 and be used to request predictions from application 104. Client device 106 may use web browser 108 to exchange messages with computer 102 using a wide area network (WAN), such as the World Wide Web of the Internet. In an embodiment, client device 106 may require no additional hardware and no additional software beyond web browser 108 to request and receive predictions of measures of radio performance from computer 102. In an embodiment, computer 102 may function as a server and client device 106 may function as a client in a client-server arrangement. In an embodiment, computer 102 and client device 106 may function in another structure or relationship. In an embodiment, computer 102 may be a special server computer.

System 100 may include radio 110, radio 112, and radio 114, but may include more or fewer radios. A user of client device 106 or other party may seek a prediction of signal strength between radio 110, radio 112, and radio 114. Radio 110, radio 112, and radio 114 are devices providing wireless transmission of signals through free space by electromagnetic radiation in radio frequency range, usually from about 30 kHz to about 300 GHz. Electromagnetic radiation may travel by means of oscillating electromagnetic fields that pass through air and the vacuum of space as well as through manmade structures. Radio 110, radio 112, and radio 114 may be used for one way or two way transmissions of voice or other communication. While bits per second may be used to express throughput rate for data transmission, a quality of service measure may be used for voice transmission, such as displaying a number of bars in the case of cell phones.

System 100 includes information sources 116. Information sources 116 may be accessed by application 104 to access data to use in making radio performance calculations. Information sources 116 may include natural terrain data source 118, urban terrain data source 120, and weather data source 122, but may include more or fewer sources of information that relate to quality of radio communication. Information sources 116 may be publicly or privately available sources of information accessible by application 104 and others. Information sources 116 may be web sites available on the World Wide Web of the Internet. Information sources 116 may additionally be databases or other data stores available on other private or public wide area networks not associated with the World Wide Web of the Internet. Information sources 116 may be accessed from electronic media locally stored in a local area network or other local network to which computer 102 has access. Information sources 116 may be stored on storage media directly accessible by computer 102. In an embodiment, information sources 116 may be hard copy, non-electronic media whose data may be entered manually or via another method by an operator of computer 102. Information sources 116 may be commercial providers of information products describing natural and manmade terrain. Examples of such products are those made available by commercial entities. An example of such a commercial entity is Presagis USA Inc.

Natural terrain data source 118 is at least one source of data about natural terrain that may obstruct or otherwise affect radio performance. Natural terrain may include mountains, valleys, trees, and bodies of water. Natural terrain data source 118 may observe, for example, the Digital Terrain Elevation Data (DTED) standard of digital datasets which may consist of at least one matrix of terrain elevation values.

Urban terrain data source 120 is at least one source of data about non-natural or manmade terrain that may obstruct or otherwise affect radio performance. Such terrain may include buildings, bridges, towers, highways, ports, railroad lines, airports, and other manmade structures or other objects. Such terrain may also include air traffic control radars at airports or radio and TV towers, which may interfere or jam radio transmission.

Weather data source 122 may be at least one source of data about weather that is proximate radio 110, radio 112, or radio 114, or combinations thereof. Weather systems, humidity, and air quality may affect radio performance. Weather includes both tropospheric weather, that may include precipitation and dust storms, as well as ionospheric weather, for example solar storm activity that may cause scintillation and degradation.

Illustrative embodiments may provide a radio performance analyzer including a cloud-accessible user communications interface. Radio performance calculator is configured to compute a measure of performance for a plurality of networked radios operable in a geographic region. The networked radios may be radio 110, radio 112, and radio 114 provided by system 100. The user communications interface is configured to receive a selection of a number of radios, for example radio 110, radio 112, and radio 114, in the plurality of networked radios, wherein the selection is formed. Radio performance calculator computes the measure of performance of the selection for a plurality of locations in the geographic region spanning a selected period of time.

The geographic region is user selectable and defined by at least one terrain database that includes an obstacle to radio communications. The at least one terrain database may be at least one of the natural terrain data source 118 and the urban terrain data source 120. The radio performance calculator further identifies at least one transmitter repeater location that enables additional measures of performance in selected locations of the plurality of locations.

The radio performance analyzer further computes the measure of performance using at the least one terrain database, at least one urban database, and at least one weather database, using radio parameters comprising antenna gain and propagation losses, and using measures of performance as a function of an interference source. The at least one terrain database may be natural terrain data source 118. The at least one urban database may be urban terrain data source 120. The at least one weather database may be weather data source 122. The user communications interface receives input in multiple data types comprising at least one of user communications interface input, extensible markup language input, and binary input.

Figure 2:
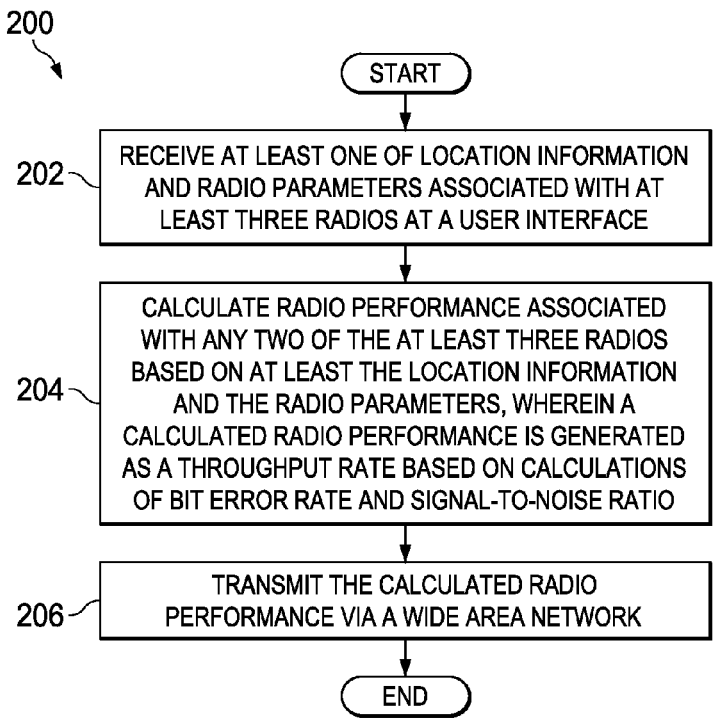
FIG. 2 is a flowchart of a method of a radio performance calculator in accordance with an illustrative embodiment.

FIG. 2 is a flowchart of a method 200 of a radio performance calculator in accordance with an illustrative embodiment. Method 200 may provide radio performance results. Method 200 shown in FIG. 2 may be implemented using system 100 of FIG. 1. The process shown in FIG. 2 may be implemented by a processor, such as processor unit 1604 of FIG. 16. The process shown in FIG. 2 may be a variation of the processes shown in FIG. 1 and FIG. 3 through FIG. 15. Although the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 200 may begin as the process may receive, at a user interface, at least one of location information and radio parameters associated with at least three radios (operation 202). Next, the process may calculate radio performance associated with any two of the at least three radios based on at least the location information and the radio parameters, wherein a calculated radio performance is generated as a throughput rate based on calculations of bit error rate and signal-to-noise ratio (operation 204). Next, the process may transmit the calculated radio performance via a wide area network (operation 206). Method 200 may terminate thereafter.

The illustrative embodiments provide for users such as aviators, mariners, law enforcement agents, cell phone service providers, and others that use stationary or mobile radio 110 to enter radio information, location data for radio 110, radio 112, and radio 114, and date and time parameters into web browser 108 and receive a prediction of radio signal strength from application 104. Users may require certain levels of signal strength to maintain desired communications. Users may be contractually bound by quality of service (QoS) requirements to maintain communications capabilities regardless of their locations or environmental conditions. Such requirements may cause users to seek predictions of levels of radio signal strength under various actual and theoretical conditions. The illustrative embodiments may promote users to receive predictions of measures of performance of signal strength and support users meeting quality of service and other requirements.

In an embodiment, a user of client device 106 may enter date and time parameters of radio 110, radio 112, and radio 114. The user may seek to determine radio signal performance during nighttime hours in contrast to radio signal performance during daytime hours. Radio signal performance during daytime and nighttime hours may differ due in part to the sun's influence on the ionosphere. A radio signal may travel differently at night by bouncing and reflecting off the ionosphere.

After accessing application 104 via web browser 108, the user may enter information about radio 110, radio 112, and radio 114 and their locations. Information about radio 110 may include a make and model number of radio 110. If known, technical information about radio such as antenna gain, process gain, power level, and modulation may be entered. In an embodiment, application 104 may be able to determine some of the technical information about radio 110 from being furnished make and model of radio 110. User may also provide similar information about at least one counterpart radio 112 and radio 114 with which radio 110 may be attempting to exchange signals.

Figure 3:
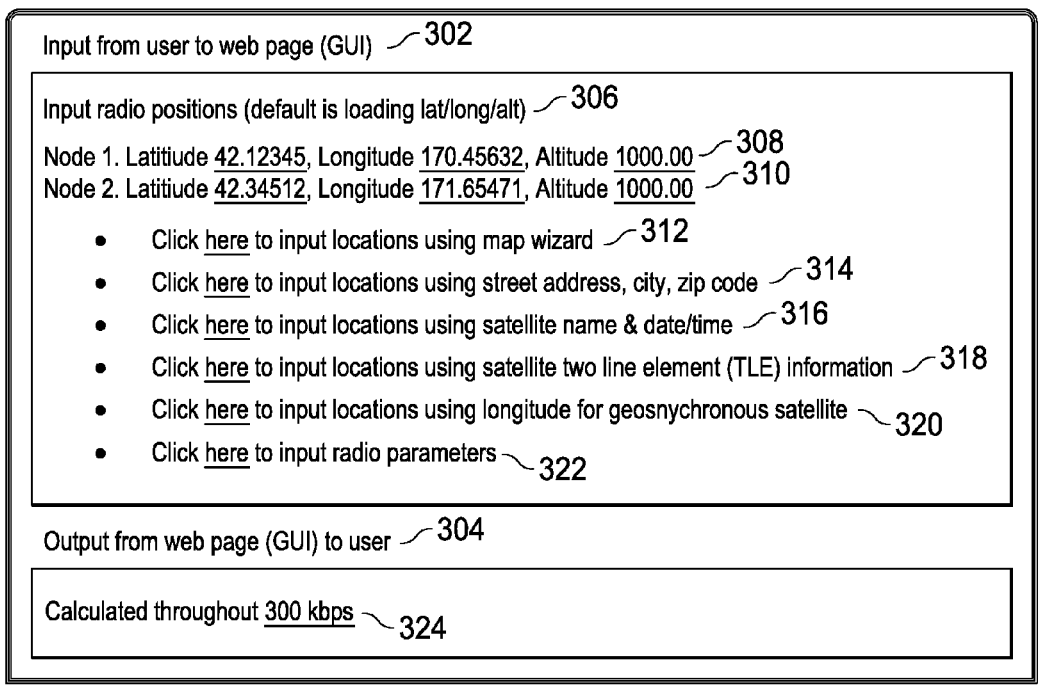
FIG. 3 is a depiction of a user communications interface in accordance with an illustrative embodiment.

FIG. 3 is a depiction of user communications interface in accordance with an illustrative embodiment. FIG. 3 depicts user communications interface displays that user at client device 106 may view when submitting information to application 104 and receiving responses therefrom. The upper display, with the heading "Input from user to web page (GUI)", depicts input fields for user to enter latitude, longitude, and altitude of nodes or radio 110 and radio 112 depicted at 302 and 304. In an embodiment, node 1 in FIG. 3 may represent radio 110 that is transmitting radio signals and node 2 in FIG. 3 may represent radio 112 that is receiving the radio signals.

It may be noted from FIG. 3 that options are available to provide locations using map wizard information, street address information, and satellite information. At 306, the user may select a link to input locations using map wizard. At 308, the user may select a link to input locations using street address, city, and zip code. At 310, the user may select a link to input locations using satellite name and data and time. At 312, the user may select a link to input locations using satellite two line element (TLE) information. At 314, the user may select a link to input locations using longitude for geosynchronous satellite. At 316, user may select a link to input radio parameters.

The lower display of FIG. 3, with the heading "Output from web page (GUI) to user", depicts calculated throughput from node 1 to node 2. In the example depicted in FIG. 3, calculated throughput is 300 kbps or kilobits per second as depicted at 318, but this rate may be higher or lower. The illustrative embodiments contemplate data throughput rates as low as hundreds of bits per second and as high as many gigabits per second.

Other inputs may be available. For example, input 320 may provide a location where a user may input locations using longitude for a geosynchronous satellite. Input 322 may provide a location where a user may input radio parameters. Other inputs may also be provided. Thus, the illustrative embodiments shown in FIG. 3 are not necessarily limiting of the claimed inventions.

While satellites may use two line element (TLE) information, other formats may promote application 104 to calculate locations and radio signal strength over time for any vehicle or other moving object that may follow a predictable and calculable trajectory. Such vehicles include satellites and other airborne vehicles, but may also include, for example, a truck on an interstate highway, a railroad train on a track, or an unmanned aerial vehicle (UAV) drone.

FIG. 4 is a depiction of a user communications interface in accordance with an illustrative embodiment. FIG. 4 depicts a user communications interface displays that user at client device 106 may view when submitting information to application 104. User may enter information about radio 110, radio 112, and radio 114. As with the upper display of FIG. 3, user may be provided fields to enter data, but such information may be automatically provided by other sources in other illustrative embodiments. In FIG. 4, a user may enter data about at least one of radio 110, radio 112, and radio 114. The user may enter data in categories depicted in FIG. 4 including frequency for radios 402, radio frequency (RF) bandwidth of radios 404, gain of antenna for radios 406, transmit power for radios 408, and modulation for radios 410.

Each category contains several selections, several of which are labeled and enumerated herein for discussion purposes in FIG. 4. For example, frequency for radios 402 provides a selection for frequency of jammer 1 412 and bandwidth of radios 404 provides a selection for RF bandwidth of radio 2 414. In other examples, gain of antenna for radios 406 provides a selection for gain of antenna for radio 1 416. In another example, transmit power for radios 408 provides a selection for transmit power for radio 1 418. In another example, modulation for radios 410 provides a selection for modulation for radio 1 420. Data entered into fields in user communications interface depicted in FIG. 4 may be used by application 104 to determine prediction of measure of radio performance.

FIG. 5 is a depiction of a user communications interface in accordance with an illustrative embodiment. FIG. 5 depicts modulation types for radios, per International Telecommunications Union (ITU). FIG. 5 provides selections from which user may choose upon using a pull-down menu in the user communications interface depicted in FIG. 4.

In an example of a use of the selections provided in FIG. 5, when making selections from the choices provided in FIG. 4, the user may select modulation for radio 1 420. When the user selects modulation for radio 1 420 in FIG. 4, the user is then presented choices depicted in FIG. 5. Three options in FIG. 5 are labeled and enumerated herein for illustration purposes. One sample option is vestigial sideband, depicted as the letter C, reference numeral 502. Another sample option is phase modulation, PM, depicted as the letter G, reference numeral 504. Another sample option is un-modulated carrier, depicted as the letter N, reference numeral 506.

FIG. 6 is a depiction of a user communications interface in accordance with an illustrative embodiment. FIG. 6 depicts a listing of selections from which user may choose if user selected G for phase modulation, PM from the user communications interface depicted for modulation types in FIG. 5. Three sample options in FIG. 6 are labeled and enumerated for discussion purposes. One sample option is 1. PM—Phase Modulation, reference numeral 602. Another sample option is 3. BPSK—Binary Phase Key Shifting, reference numeral 604. Another sample option is 5. 8 PSK—8 Point Phase Key Shifting, reference numeral 606.

In an embodiment a user communications interface may be provided to a user that may access computer 102 and application 104 from client device 106. The user communications interface accessed by the user may be provided by web browser 108 executing on client device 106. The user communications interface may provide a pull down or drop down menu that might provide a selectable listing of well known brand names of radio 110, radio 112, radio 114 that may be commercially available. Such a user communications interface may be helpful for a user who may be an ordinary consumer as opposed to a professional in the aviation, maritime, or other field that uses communications devices of various types. The user communications interface may include other pull down or drop down menus that may promote the user to make other selections associated with the chosen radio 110. In an embodiment, instead of pull down or drop down menus, other methods of selection or entry may be provided such as selectable links, selectable radio buttons, or writeable fields wherein the user may type in a brand name or other information about radio 110.

Figure 7:
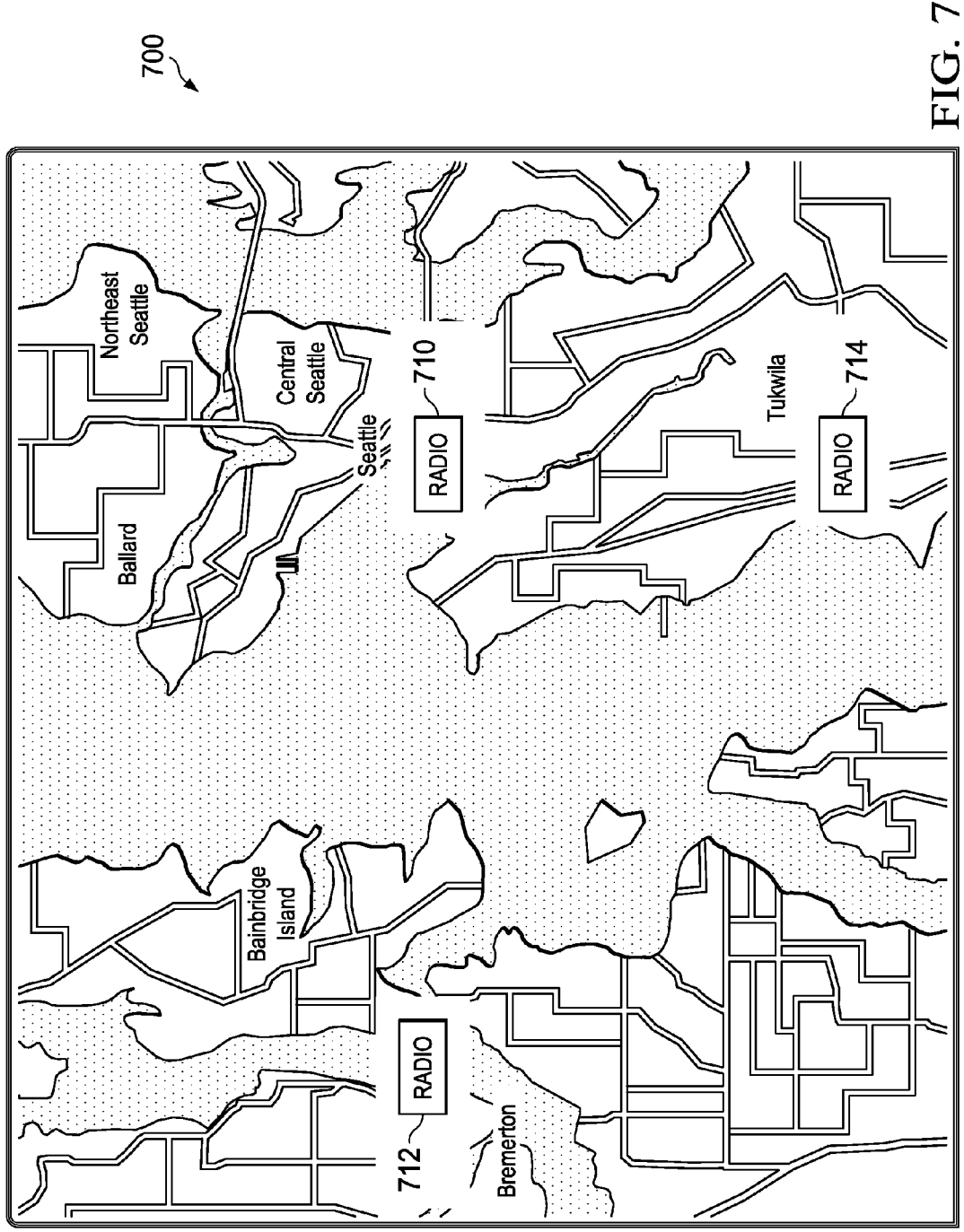
FIG. 7 is a depiction of a user communications interface in accordance with an illustrative embodiment.

FIG. 7 is a depiction of a user communications interface in accordance with an illustrative embodiment. When using a user communications interface to enter data and receive results, user may use a map tool to input locations of radio 110, radio 112, and radio 114 instead of using text entries as discussed in connection with FIG. 3 and FIG. 4. User may open a map and click on locations on the map where at least one of radio 110, radio 112, and radio 114 is located. FIG. 7 depicts map with various locations of radio 710, radio 712, and radio 714. Components depicted in FIG. 7 are indexed to components depicted in FIG. 1. Radio 710, radio 712, and radio 714 depicted in FIG. 7 correspond to radio 110, radio 112, and radio 114 depicted in FIG. 1. When user clicks on points on map, application 104 is automatically populated with locations associated with the selected points. The map may be built into application 104 or may be accessible by a web service not associated with application 104. FIG. 7 provides a map for discussion purposes with, for example, radio 710 located in Seattle, radio 712 located in Bremerton, and radio 712 located in Tukwila. The user of client device 106 may wish to be provided radio signal strength between radio 710, radio 712, and radio 714. The user may click on the three points, one each for Seattle, Bremerton, and Tukwila. Application 104 receives coordinates or other location information for the three points and makes predictions of radio signal strength between each of the three points.

Figure 8:
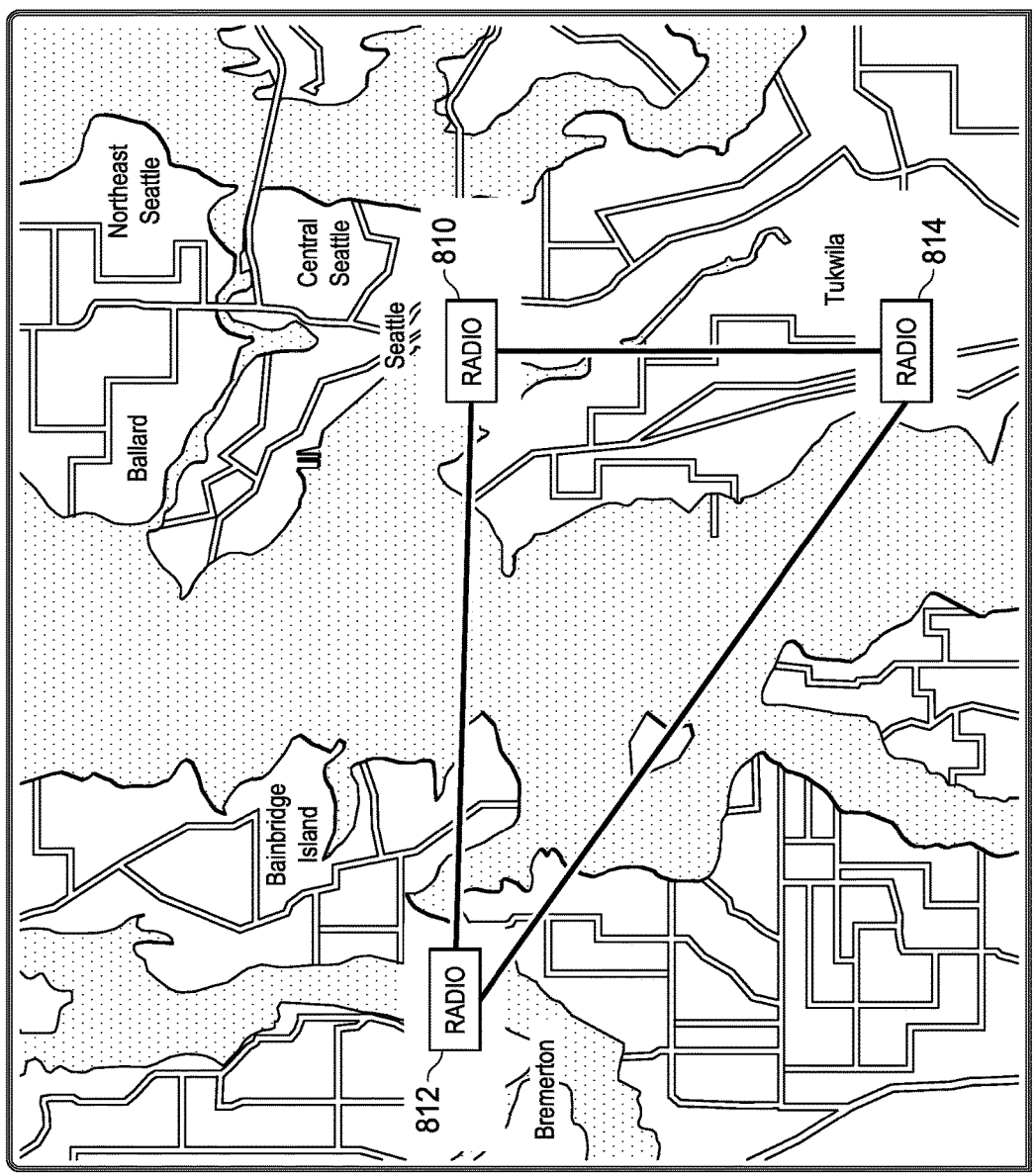
FIG. 8 is a depiction of a user communications interface in accordance with an illustrative embodiment.

FIG. 8 is a depiction of a user communications interface in accordance with an illustrative embodiment. Components depicted in FIG. 8 are indexed to components depicted in FIG. 7. Radio 810, radio 812, and radio 814 depicted in FIG. 8 correspond to radio 710, radio 712, and radio 714 depicted in FIG. 7. FIG. 8 depicts the map depicted in FIG. 7 with lines between radio 810, radio 812, and radio 814. The lines represent various throughput rates between each of radio 810, radio 812, and radio 814 calculated by application 104. In an embodiment, the lines may be depicted in different thicknesses, each thickness of line representing a different range of throughput rates for transmission between each of radio 810, radio 812, and radio 814. In an embodiment, the thick bold line depicted between radio 814 and radio 810 may represent a higher throughput rate than the less thick bold line depicted between radio 814 and radio 812.

FIG. 9 is a depiction of a user communications interface in accordance with an illustrative embodiment. Illustrative embodiments provide for input to application 104 to be provided in a data file or input file in Extensible Markup Language (XML) format. FIG. 9 provides a depiction of data file or input file in Extensible Markup Language (XML) format and may be an Extensible Markup Language (XML) computer-to-computer file. The data file or input file would be submitted to application 104 which would process the input and provide its output to the user at client device 106. What is presented in FIG. 9 is a representation of the data file or input file and may not be exactly what a user may visually see when situated in front of client device 106. If the user were to cause client device 106 to present a view of the data file or input file, it may not appear exactly as presented in FIG. 9.

The user of client device 106 in submitting a request to application 104 would provide a data file or input file in Extensible Markup Language (XML) format such as is depicted in FIG. 9. Application 104 would recognize that the data file or input file is in Extensible Markup Language (XML) format and would process the input file accordingly.

The group of bracketed entries indicated by reference numeral 902 in FIG. 9 provides locations of five nodes. The group of bracketed entries indicated by reference numeral 904 in FIG. 9 provides locations of five radios. Reference numeral 906 describes a frequency of jammer. The group of bracketed entries indicated by reference numeral 908 in FIG. 9 provides bandwidth of five radios. The entry indicated by reference numeral 910 describes a bandwidth of jammer. The group of bracketed entries indicated by reference numeral 912 in FIG. 9 provides gain of antenna of five radios. Reference numeral 914 describes a gain of antenna for jammer. The group of bracketed entries indicated by reference numeral 916 in FIG. 9 provides transmit power for five radios. Reference numeral 918 describes transmit power for jammer. Reference numeral 920 describes modulation for radio and reference numeral 922 describes modulation for jammer.

Figure 10:
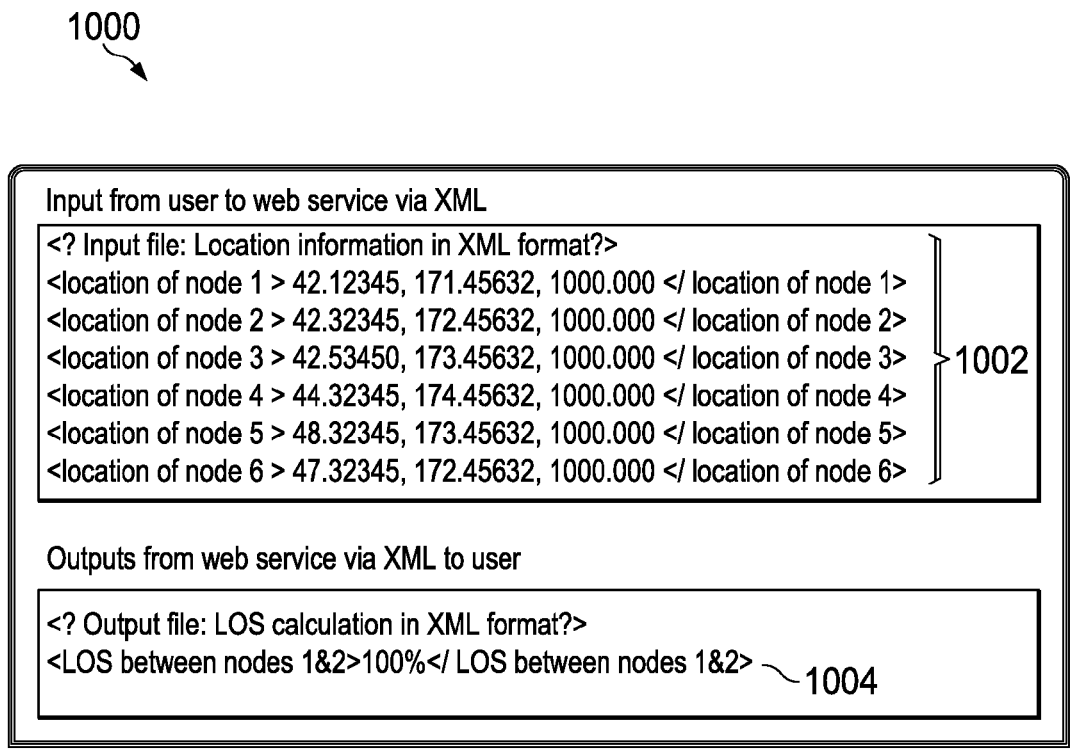
FIG. 10 is a depiction of a user communications interface in accordance with an illustrative embodiment.

FIG. 10 is a depiction of a user communications interface in accordance with an illustrative embodiment. FIG. 10 provides a depiction of contents of another data file or input file in Extensible Markup Language (XML) format. The data file or input file may be an Extensible Markup Language (XML) computer-to-computer file. FIG. 10 also provides a user communications interface depiction of a data file or output file generated by application 104 in Extensible Markup Language (XML) format. Similar to FIG. 9, what is presented in FIG. 10 is a representation of the data files, input file, or output file and may not be exactly what a user may visually see when situated in front of client device 106. If the user were to cause client device 106 to present a view of the data files, input file, or output file, they may not appear exactly as presented in FIG. 10. Further, what may appear to be headings atop the boxes in which the input and output appear may not appear to the user and may be depicted in FIG. 10 for discussion purposes.

The user of client device 106 in submitting a request to application 104 would provide an input file in Extensible Markup Language (XML) format such as is depicted in the upper portion of FIG. 10. Bracketed locations of six nodes are depicted in FIG. 10, reference numeral 1002. Application 104 would recognize that the input file is in Extensible Markup Language (XML) format and would process the input file as described herein. Application 104 provides output to client device 106 as depicted in the lower portion of FIG. 10, reference numeral 1004. In the example of FIG. 10, output provided is for a measurement of line of sight between node 1 and node 2 which in the example is 100%.

FIG. 11 is a depiction of a user communications interface in accordance with an illustrative embodiment. FIG. 11 provides a data file that is an example of output of application 104 where predictions of throughout rate between pairs of five instances of radio 110 are calculated and displayed. In an embodiment, FIG. 11 depicts a data file represented therein as a table providing throughput rates. Similar to FIG. 9 and FIG. 10, what is presented in FIG. 11 is a representation of the data file and may not be exactly what a user may visually see when situated in front of client device 106. If the user were to cause client device 106 to present a view of the data files, input file, or output file, they may not appear exactly as presented in FIG. 11. In FIG. 11, throughput rate for most combinations of radios is 300 kbps. However, in three of the combinations, throughput is not 300 kbps. From radio 2 to radio 3, reference numeral 1102, throughput rate is 330 kbps, higher than the others. The higher throughput rate may be due to unusually good weather conditions from radio 2 to radio 3. From radio 3 to radio 1, reference numeral 1104, throughput rate is 220 kbps, lower than the others. The lower throughput rate may be due to a temporary or permanently lower power level for radio 3. From radio 5 to radio 4, reference numeral 1106, throughput rate is 250 kbps, lower than most. The lower throughput rate may be due to a manmade structure partially obstructing radio signals between radio 5 and radio 4.

Attenuation, loss, and distortion of radio signals may be predicted and calculated using various models, including some propagation models that may be physics-based, such as the free space propagation model, the Longley-Rice model, or the Terrain Integrated Rough Earth Model (TIREM). Radio propagation models may be empirical mathematical formulations for characterization of radio wave propagation as a function of frequency, distance and other conditions. A radio propagation model may be developed to predict the behavior of propagation for similar links under similar constraints. Such models may predict path loss along a link or the effective coverage area of a transmitter.

In an embodiment, radio 110, radio 112, and radio 114 that may be examples of elements of FIG. 11 may be various distances away from each other. Those that are closest may have higher data rates, and the ones that are far away may have slower data rates. In an embodiment, radio 110, radio 112, and radio 114 could have a mountain or buildings between them. If a radio 110 is at the top of hill, radio 110 may exhibit better data rates than if radio 110 were in bottom of a gulley. Throughput rates in such an instance may not be due to unusually good or bad weather between them, as in the embodiment above. Radio 110, radio 112, and radio 114 may, for example, have different antennas (automobile as opposed to tower), or be at different power levels (backpack battery as opposed to tower). In some embodiments, some throughput rates that may be zero, due to, for example, a mountain being situated between subject radio 110, radio 112, and radio 114.

Figure 12:
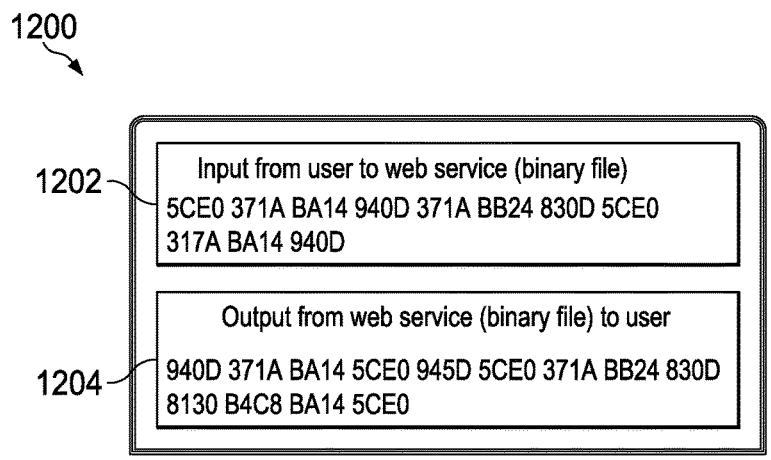
FIG. 12 is a depiction of a user communications interface in accordance with an illustrative embodiment.

FIG. 12 is a depiction of a user communications interface in accordance with an illustrative embodiment. Illustrative embodiments provide for input to be submitted by client device 106 to application 104 and received therefrom in binary format. FIG. 12 provides a user communications interface depiction of input to and output from application 104 in binary format. In an embodiment, the material depicted in FIG. 12 is a binary data file. Similar to FIG. 9, FIG. 10, and FIG. 11, what is presented in FIG. 12 is a representation of binary data files and may not be exactly what a user may visually see when situated in front of client device 106. If the user were to cause client device 106 to present a view of the binary data files, they may not appear exactly as presented in FIG. 12. Further, what may appear to be headings atop the boxes in which the input and output appear may not appear to the user and may be depicted in FIG. 12 for discussion purposes. An example of a user communications interface is a graphical user interface.

In the upper panel of FIG. 12 appears a first string a binary data, reference number 1202. The first string of binary data represents location information for at least one of radio 110 and radio 112. The user of client device 106 provides the first string of binary data in an input file to application 104. Application 104 processes the first string of binary data as described herein. Application 104 provides a prediction of measure of performance to client device 106 as a second string of binary data, reference numeral 1204 in FIG. 12.

Figure 13:
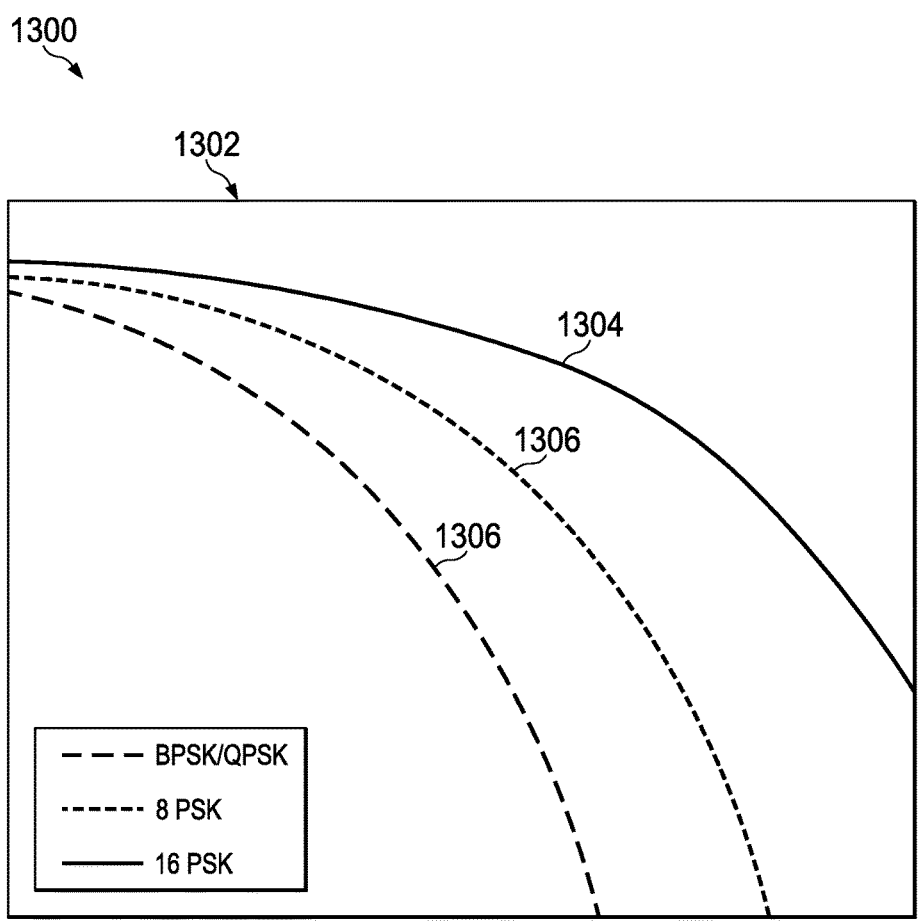
FIG. 13 is a diagram of lookup tables in accordance with an illustrative embodiment.

FIG. 13 is a diagram of lookup tables according to an illustrative embodiment. FIG. 13 depicts two examples of first lookup tables that may provide analysis results of operations described herein. Application 104 may determine prediction of radio signal strength by calculating signal-to-noise ratio using input parameters described herein. Using signal-to-noise ratio modulation, and first lookup tables, application 104 calculates bit error rate. First lookup tables may be available from public information sources.

Signal-to-noise ratio (SNR) equals received signal power in decibels minus average noise power in decibels. Received signal power is the power of a signal arriving at a receiving radio 110, is typically calculated in decibels, and is equal to the signal power of the transmitting radio 112 plus any gains, for example antenna gain, minus any losses, for example free space path loss and terrain blockage. Received signal power may equal equivalent isotropically radiated power (EIRP) minus path loss plus antenna gain. Equivalent isotropically radiated power (EIRP) is expressed in terms of dBW or decibel-watt and is analogous to transit power. Antenna gain may be expressed in dBi (decibel isotropic) as opposed to being expressed in DBd (decibel detail). Signal propagation loss and noise power may be calculated using several well known and publicly available formulas.

Average noise power equals kTB, wherein "k" is Boltzmann's constant, "T" is noise temperature in Kelvins, and "B" is bandwidth in Hz. For purposes of calculating signal-to-noise ratio, noise may include interference and jammer effects such that signal-to-noise ratio may more correctly be expressed as signal-to-(noise+jammer+interference) ratio. A typical calculation may be as follows: path loss equals 32.4 plus 20 log(f) plus 20 log(d) wherein path loss is expressed in decibels, "f" is expressed in Megahertz or MHz, and d is expressed in meters. The primary inputs are therefore operating frequency or wavelength, distance between transmitter and receiver, transmitter power which may be equivalent isotropically radiated power (EIRP), transmitter antenna gain, receiver antenna gain, and noise power. Using the information provided herein, the following equation may be formed:

$$SNR=(EIRP-(32.4+20\ log(f)+20\ log(d))+\text{antenna gains})-kTB$$

Equivalent isotropically radiated power (EIRP) is transmission power of radio 110 expressed in dBW or decibel-watt without antenna gain. Antenna gains are the sum of all antenna gains and are expressed in dBi (decibel isotropic) as opposed to being expressed in DBd (decibel detail). B is radio frequency bandwidth expressed in gigahertz or GHz. F is frequency expressed in gigahertz or GHz. Locations of radio 110, radio 112, and radio 114 may be expressed in longitude, latitude, and altitude. Parameters that application 104 may retain are "k" for Boltzmann's constant, "T" for noise temperature in Kelvins, and "d", which application 104 determines based on inputs provided by user. Once received signal power has been calculated, application 104 then uses lookup tables, an example of which is provided in FIG. 13, to convert signal-to-noise ratio (SNR) to bit error rate (BER). The first exemplar lookup table of FIG. 13, reference numeral 1302, depicts three different curves or relationships between signal-to-noise ratio (SNR) and bit error rate (BER). The curves indicate a use of different types of modulation including phase key shifting, reference numeral 1304, and a combination of binary phase key shifting and quadrature phase key shifting, reference numeral 1306.

Figure 14:
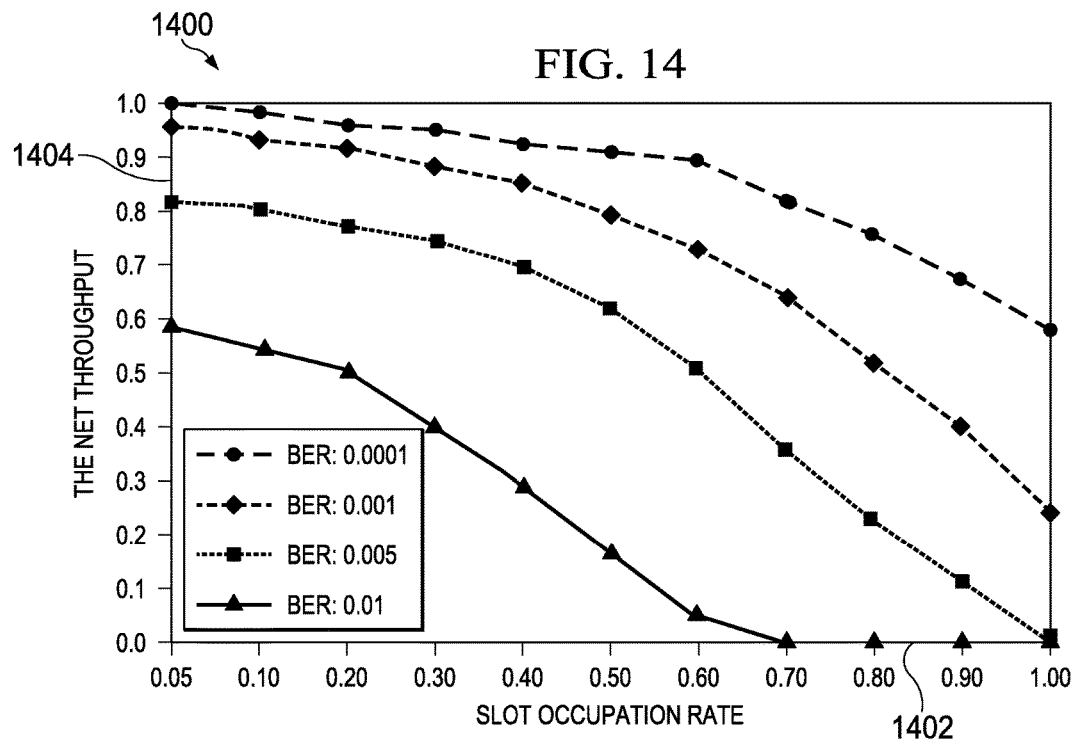
FIG. 14 is a diagram of a second exemplar lookup table in accordance with an illustrative embodiment.

FIG. 14 is a diagram of a second exemplar lookup table in accordance with an illustrative embodiment. FIG. 14 provides an example of a diagram of a second lookup table in accordance with an illustrative embodiment and may depict results of analysis operations as described herein. Application 104 converts bit error rate (BER) to throughput rate via use of second lookup tables, an example of which is depicted in FIG. 14. These lookup tables for converting signal-to-noise ration to bit error rate, and from bit error rate to throughput data rate may be accessed from public information sources. The x-axis of the graph in FIG. 14, reference numeral 1402, represents bit error rate, analogously slot occupation rate. The y-axis of the graph in FIG. 14, reference numeral 1404, represents net throughput rate. The curves in the graph represent different combinations of bit error rate and net throughput.

In an embodiment, a global positioning system (GPS) may capture location information. The location information may be transmitted automatically by client device 106 to application 104 for processing as described herein. Examples of global positioning system (GPS) interface include IS-GS-164 that may be used by the United States military and NMEA 0183 interface.

Application 104 also takes into account any jammers or other sources of interference, for example airport radar transmitters. System 100 may be used to test hundreds or thousands of locations of radio 110, radio 112, and radio 114 and provide the user an opportunity to choose the best radio transmission routes available at the time. User may be subject to a policy with which the user must comply in choosing whether a measure of performance is acceptable or unacceptable.

System 100 may be useful to military commanders in modeling, simulation, and analysis associated with war games. A commander may, for example, seek to determine if an aircraft moved to a specific location during a bombing operation would have radio linkage to a radio relay or if the radio relay needs to be moved to maintain radio connectivity. Ground troops moving into hostile or unknown territory may seek similar information. Coast guard engaging in search and rescue mission, pipeline workers in remote locations, and oil platform workers may also use system 100. System 100 may be used by commanders or others to determine if an unobstructed line of sight is available between two points.

System 100 may be used to predict accuracy of forwarding/routing packets of data within a radio network involving many of radio 110, radio 112, and radio 114. A sending computer connected to radio 110 sends a message containing data to a receiving computer at radio 112 but is unable to do so directly because of distance. The message may get routed and relayed by radios between radio 110 and radio 112. Application 104 may use the Open Shortest Path First (OSPF) protocol, which is a link-state routing protocol for finding the least "cost" (shortest path or route) to move the message from the sending computer and radio 110 to the receiving computer and radio 112. Application 104 could calculate a combined delay (in milliseconds), a net data rate throughput, and a combined corruption (as a percent, expressed as bit-error-rate or message packet corruption rate) for the intermittent radios relaying the message.

Figure 15:
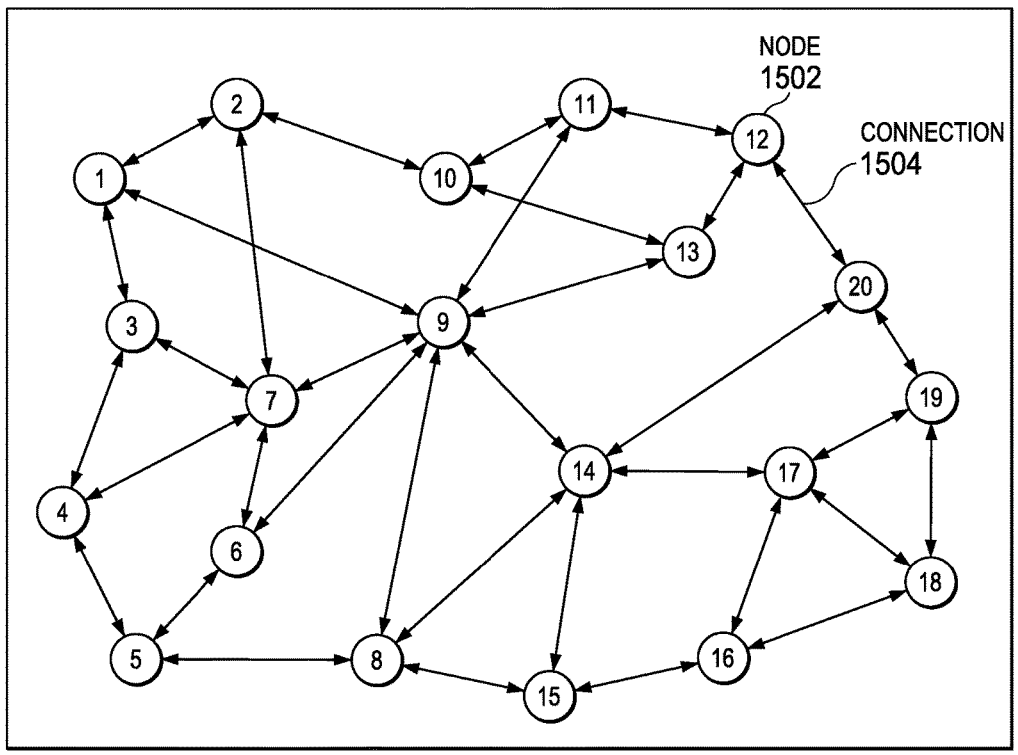
FIG. 15 is a depiction of a network in accordance with an illustrative embodiment.

FIG. 15 is a diagram of a network in accordance with an illustrative embodiment. The network depicted in FIG. 15 may be a radio network. FIG. 15 depicts an example of a network described above wherein a plurality of nodes or instances of radio 110, radio 112, and radio 114 may seek to send messages to each other. Nodes are numbered circles and arrows represent available connections. Node 12, reference numeral 1502, is an example of a node or instance of radio 110, radio 112, or radio 114. Reference numeral 1504 is an example of a connection in FIG. 15. Application 104 may use the Open Shortest Path First (OSPF) protocol to find the lowest cost or shortest path or route to move messages across intermittent nodes from sending computer and radio 110 to receiving computer and radio 112. Other protocols may also be used.

Illustrative embodiments may also include an aircraft including a fuselage configured for flight, a computer including a bus, a processor connected to the bus, and a memory connected to the bus. The computer may be computer 102 provided by system 100 and memory may be memory 1606 provided by data processing system 1600 and depicted in FIG. 16. Memory stores program code. Program code may be program code 1618 provided by data processing system 1600. When executed by processor, program code may perform a computer-implemented method. Program code includes program code for performing, using the processor, sending a first message requesting a prediction of radio performance between at least two locations, entering coordinates for the at least two locations, and receiving the requested prediction of radio performance. Program code is executed when aircraft is at least one of airborne and on the ground.

Turning now to FIG. 16, an illustration of a data processing system is depicted in accordance with an illustrative embodiment. Data processing system 1600 in FIG. 16 is an example of a data processing system that may be used to implement the illustrative embodiments, such as system 100 of FIG. 1, or any other module or system or process disclosed herein. In this illustrative example, data processing system 1600 includes communications fabric 1602, which provides communications between processor unit 1604, memory 1606, persistent storage 1608, communications unit 1610, input/output (I/O) unit 1612, and display 1614.

Processor unit 1604 serves to execute instructions for software that may be loaded into memory 1606. Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output (I/O) unit 1612 allows for input and output of data with other devices that may be connected to data processing system 1600. For example, input/output (I/O) unit 1612 may provide a connection for user input through a keyboard, a mouse, and/or some other suitable input device. Further, input/output (I/O) unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different embodiments may be performed by processor unit 1604 using computer implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626. Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1618 may be omitted because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

As another example, a storage device in data processing system 1600 is any hardware apparatus that may store data. Memory 1605, persistent storage 1608, and computer readable media 1620 are examples of storage devices in a tangible form.

In another example, a bus system may be used to implement communications fabric 1602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1605, or a cache, such as found in an interface and memory controller hub that may be present in communications fabric 1602.

Data processing system 1600 may also include associative memory 1628. Associative memory 1628 may be in communication with communications fabric 1602. Associative memory 1628 may also be in communication with, or in some illustrative embodiments, be considered part of storage devices 1616. While one associative memory 1628 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

Figure 17:
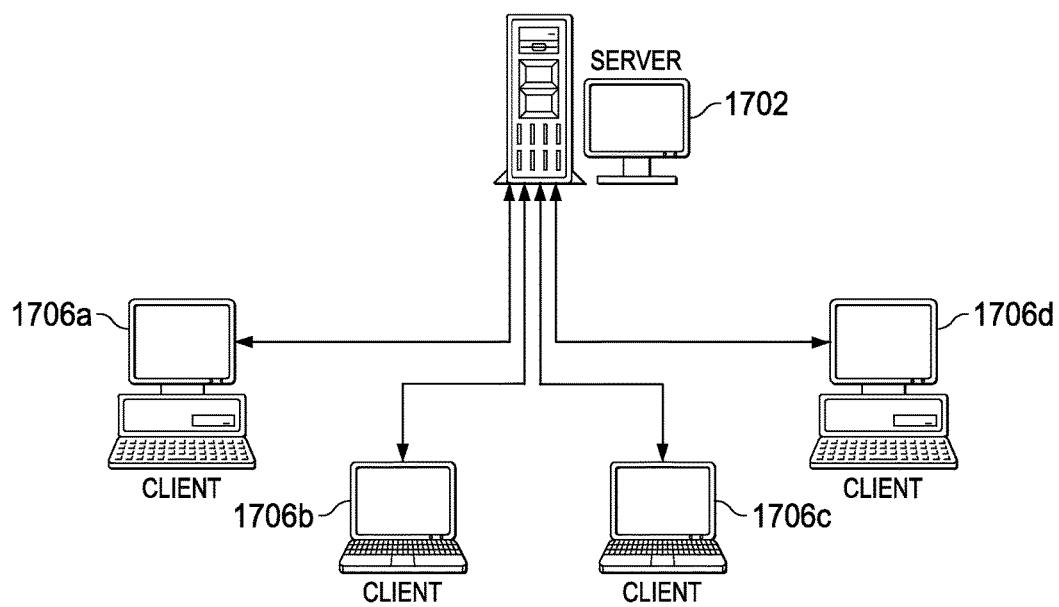
FIG. 17 is an illustration of a network in accordance with an illustrative embodiment.

FIG. 17 is an illustration of a network in accordance with an illustrative embodiment. Components depicted in FIG. 17 are indexed to components in FIG. 1. Server 1702 depicted in FIG. 17 corresponds to computer 102 depicted in FIG. 1. Client 1706a, client 1706b, client 1706c, and client 1706d depicted in FIG. 17 correspond to client device 106 depicted in FIG. 1. As noted, client device 106 and computer 102 of system 100 may interact in a client-server arrangement. The configuration depicted in FIG. 17 may provide an example of such a client-server arrangement. Client 1706a, client 1706b, client 1706c, and client 1706d, while provided variants of the same reference numeral, may be identical to each other and located together or they may be entirely different from each other from both a hardware and software perspective and may also be geographically distant from each other. For example, client 1706a may be a desktop computer located in North America and client 1706c may be a mobile device located in Asia.

While the term "client" has been used herein in various discussions, the systems and methods provided herein are not dependent on a traditional client and server structure or relationship between client device 106 and computer 102. In an embodiment client device 106 and computer 102 do not function in a client and server structure. In an embodiment, client device 106 and computer 102 may have a handshaking or other relationship that is limited to the methods provided herein such that client device 106 and computer 102 otherwise perform functions unrelated to the present disclosure. In an embodiment, user communications interfaces are not used in the conduct of the methods provided herein and standards and formats such as Extensible Markup Language (XML) format are not used. In an embodiment, client device 106 and computer 102 do not interact with each other over a wide area network or other network. In an embodiment, client device 106 and computer 102 interact with each other in another manner, such as locally wherein a network is not involved or wherein the functionality of client device 106 and computer 102 relevant to the present disclosure execute on the same physical computer or other device.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A radio performance analyzer system, comprising:
   a client computer comprising a cloud-accessible user communications interface comprising a Web browser; and
   a server computer, in communication with the client computer, comprising a radio performance calculator configured to compute a measure of performance for a plurality of networked radios operable in a geographic region based on information received from the client computer, wherein:
   the user communications interface is configured to receive a selection of a number of radios in the plurality of networked radios, wherein a selection is formed;
   the radio performance calculator is configured to compute the measure of performance of the selection for a plurality of locations in the geographic region spanning a selected period of time,
   the radio performance calculator is configured to compute the measure of performance based on calculations of bit error rate and signal-to-noise ratio, wherein the radio performance analyzer further is configured to compute the measure of performance using all of a terrain database, an urban database, and a weather database, using radio parameters comprising antenna gain and propagation losses, and wherein the radio performance calculator further is configured to identify at least one transmitter repeater location that enables additional measures of performance in selected locations of the plurality of locations; and
   the radio performance calculator is configured to determine whether the measure of performance is acceptable or unacceptable based on a policy, and wherein the server computer is configured to transmit the measure of performance and an acceptability of the measure of performance to the Web browser of the client computer.

2. The radio performance analyzer system of claim 1, wherein at least one of the plurality of networked radios is in motion and at least one of the plurality of networked radios includes at least one transmitter.

3. The radio performance analyzer of claim 1 system, wherein the geographic region is user selectable and defined by the at least one terrain database that includes an obstacle to radio communications.

4. The radio performance analyzer system of claim 3, wherein the at least one terrain database is accessed from sources on a wide area network.

5. The radio performance analyzer system of claim 1, wherein the user communications interface is configured to receive input in multiple data types comprising at least one of user communications interface input, extensible markup language input, and binary input.

6. The radio performance analyzer system of claim 1, wherein the radio performance analyzer is configured to support quality of service (QoS) determinations for at least one radio associated with at least one location.

7. The radio performance analyzer system of claim 1, wherein the radio performance calculator is provided as a web service.

8. A method of providing radio performance results, comprising:
   operating at least three radios at a plurality of locations;
   receiving, at a user interface executed by a client processor, at least one of location information and radio parameters associated with the at least three radios;
   transmitting the at least one of location information and the radio parameters to a server processor remove from the client processor;
   calculating, at the server processor, radio performance associated with any two of the at least three radios based on the at least one of location information and radio parameters, wherein a calculated radio performance is generated as a throughput rate based on calculations of bit error rate and signal-to-noise ratio, and wherein calculating includes identifying at least one transmitter repeater location that enables additional measures of performance in selected locations of the plurality of locations;
   transmitting the calculated radio performance to the client processor via a wide area network;
   displaying, on the user interface, the calculated radio performance;
   determining, by the processor, whether the calculated radio performance is acceptable or unacceptable based on a policy; and
   displaying an indication whether the calculated radio performance is acceptable or unacceptable.

9. The method of claim 8, wherein calculating is based on data received from all of a terrain database, an urban database, and a weather database, and wherein calculating is further based on all of antenna gain data, propagation loss data, and interference existence data.

10. The method of claim 8, wherein the user interface receives location information in multiple input types comprising user communications interface input, extensible markup language input, binary input, and input from a global positioning system (GPS) interface.

11. The method of claim 8, wherein calculating is performed by a web service.

12. An aircraft comprising:
   a fuselage configured for flight;
   a computer, comprising:
   a bus;
   a processor connected to the bus; and
   a memory connected to the bus, the memory storing program code which, when executed by the processor, performs a computer-implemented method, the program code comprising:
   program code for sending, using the processor, a first message requesting a prediction of radio performance between at least two locations;

program code for entering, using the processor, coordinates for the at least two locations;

program code for receiving using the processor, the prediction of radio performance, wherein a measure of radio performance is established by calculations of bit error rate and signal-to-noise ratio, and wherein the prediction is based at least on all of natural terrain data, urban terrain data, and weather data associated with the at least two locations, and wherein receiving includes receiving an identification of at least one transmitter repeater location that enables additional measures of performance in at least one of the two locations; and program code for, using the processor, determining whether the measure of performance is acceptable or unacceptable based on a policy; and a display device in communication with the computer, the display device configured to display whether the measure of performance is acceptable or unacceptable.

13. The aircraft of claim 12, wherein the natural terrain data, urban terrain data, and weather data are obtained from sources on a wide area network.

14. The aircraft of claim 12, wherein the prediction of radio performance is determined by a web service, the web service accessed by at least one of binary input and Extensible Markup Language (XML) input.

15. The aircraft of claim 12, wherein the coordinates are entered as at least one of text and as points selected on a map.

16. The aircraft of claim 12, wherein the program code is executed when the aircraft is at least one of airborne and on the ground.

* * * * *